Dec. 10, 1963  H. M. ROGERS  3,113,795
COUPLING DEVICE
Filed Feb. 6, 1961
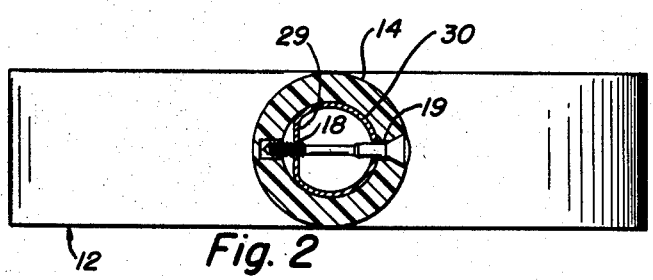
Fig. 2
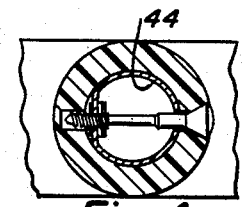
Fig. 4
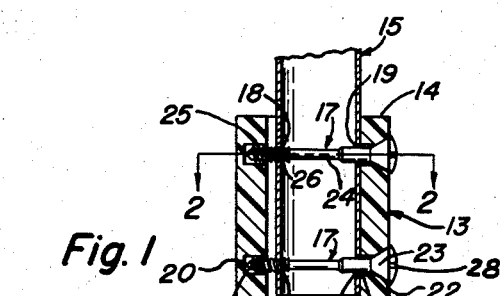
Fig. 1
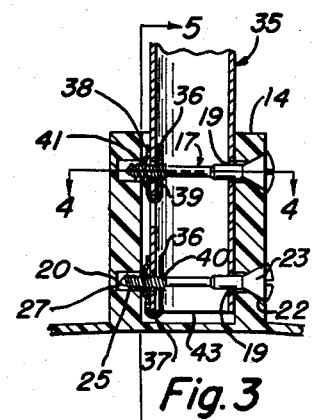
Fig. 3
Fig. 5
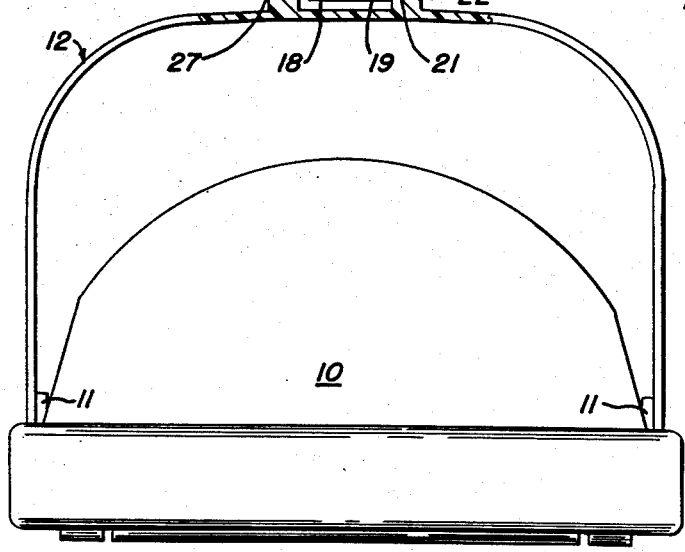

United States Patent Office 3,113,795
Patented Dec. 10, 1963

3,113,795
COUPLING DEVICE
Herbert M. Rogers, Canton, Ohio, assignor to The Hoover Company, North Canton, Ohio, a corporation of Ohio
Filed Feb. 6, 1961, Ser. No. 87,340
5 Claims. (Cl. 287—119)

The present invention relates to couplings and more particularly to attaching a handle to the body of an electrical appliance such as a suction cleaner.

An object of the invention is to provide a coupling having telescoping sections, the wall of one of the sections being deformed and expanded to rigidly engage the wall of the other section. Another object is to provide a coupling having telescoping sections and means in the outer section secured to fastening means on the wall of the inner section to exert a force thereon to alter the contour of the inner section wall and expand the latter into rigid engagement with the wall of the outer section. Other objects and advantages of the invention will become apparent from the following description and drawing, wherein:

FIGURE 1 is a sectional view of one embodiment of the coupling for attaching a handle to a suction cleaner, FIGURE 2 is a section along the line 2—2 in FIGURE 1, FIGURE 3 is a sectional view of another embodiment of the coupling, FIGURE 4 is a section along the line 4—4 in FIGURE 3, and FIGURE 5 is a section on the line 5—5 in FIGURE 3.

The embodiment of the invention disclosed in FIGURES 1 and 2 comprises a body of a suction cleaner shown generally at 10 to which is pivotally mounted at 11 a handle bail 12 provided with a centrally arranged socket 13 having an annular wall 14. A handle 15 only partly shown has its lower portion telescoped within the socket 13.

The handle 15 is rigidly attached to the socket 13 by a pair of threaded bolts 17 arranged in openings in the handle 15 and socket 13. The wall of the handle 15 is provided with a pair of diametrically opposed openings 18 and 19 which are in alignment with a pair of openings 20 and 21 in the socket 13, the openings 21 terminating in a flared seat 22. Each of the bolts 17 have a truncated head 23 bearing against the flared seat 22, a shank portion 24 is spaced from the defining edges of the handle openings 19, and a threaded portion 25 is of such size to threadingly engage the defining edge 26 of the handle openings 18. A portion 27 of each bolt 17 projects outwardly of the handle 15 into the socket opening 20 in non-threaded relation. Each bolt 17 is provided with a slot 28 for reception of a screw driver to thread the bolts relatively to the handle openings 18.

In assembling the parts, the handle 15 is first inserted in the socket 13 and the wall of the handle is initially circular in cross section and in loose contact with the interior surface of the socket 13. The bolts 17 are inserted through the socket openings 21 and adjacent handle openings 19 and the threads 25 are threaded into the handle openings 18. The defining edge of the handle openings 18 form a fastening means for receiving the screw threads 25. A screw driver is then placed in each slot 28 of the bolts 17 to tighten the latter. Rotating the bolts 17 in a clockwise direction causes the threads 25 to advance through the handle openings 18 and exert a force on the handle wall to collapse the latter in a direction axially of and towards the heads 23 of the bolts as indicated at 29. Collapsing the handle wall axially along the bolts 17 causes the remaining handle wall area 30 to expand laterally outwardly into tight engagement with the inner surface of the socket wall to rigidly secure the handle in the socket 13. The material of the handle 15 is more resilient than the socket wall 14 whereby pressure exerted by the bolt heads 23 on the socket wall at the flared openings 22 does not cause the socket wall 14 to be deformed, however, the wall of the handle is distorted to form a press fit with the interior surface of the handle socket 13.

When it is desired to remove the handle 15 from the socket 13 the bolts 17 are rotated counterclockwise to release the pressure of the bolt heads 23 on the socket wall 14, whereby the resiliency of the material in the handle wall causes the latter to approach its original circular contour so that the handle can be disconnected when the bolts 17 are completely removed.

The embodiment of the invention disclosed in FIGURES 3 to 5 includes the previously described handle socket 13 in which is arranged the lower end of a handle 35. The handle 35 is provided with a pair of openings 36 which are diametrically opposed to the handle openings 19 and are of greater size than the threaded portion 25 of the bolts 17. A fastening means 37 is placed in alignment with each of the openings 36 to engage the threads 25 on the bolts 17. The fastening means 37 are U-shaped to provide spaced walls 38 and 39 arranged on opposite sides of the handle wall. The inner wall 39 of each fastening means has an opening 40 which loosely receives the threads 25 on the bolts 17. The outer wall 33 has an opening 41 which provides fastening means for threadedly receiving the threads 25 on the bolts 17. A rectangular opening 42 is provided below the handle upper opening 36 for arranging the fastening means 37 in alignment with the upper opening 36. The fastening means 37 for the handle lower opening 36 is aligned with the latter by sliding the fastening means upwardly from the lower edge 43 of the handle 35.

The handle 35 is connected to the socket 13 in the same manner as in the previous embodiment except that the bolts 17 are threaded into the fastening means 37 secured to the handle 35. Tightening of the bolts 17 deforms only the resilient wall of the handle 35 axially of the bolts 17 causing the remaining portion 44 of the handle wall to expand into tight engagement and conform with the interior surface of the handle socket 13 ot thereby clamp the handle 35 in the socket 13.

While I have shown and described several embodiments of my invention, it is to be understood that those embodiments are to be taken as illustrative only and not in a limiting sense. I do not wish to be limited to the particular structure shown and described but to include all equivalent variations except as limited by the scope of the claims.

I claim:

1. A coupling comprising telescopingly engaged inner and outer tubular members, means forming an unthreaded opening in said outer member, fastening means on said inner member and arranged at one end of its diameter opposite said unthreaded opening in said outer member, screw means having headed and threaded portions, said screw means arranged in said opening with said headed portion exerting a force against said unthreaded opening in said outer member and said threaded portion screwed into said fastening means on said inner member to force the wall of the latter tightly against the inner wall area of said outer member.

2. A coupling as described in claim 1 and means on said headed portion for receiving a force to rotate said screw means and thus collapse the wall of said inner member axially of said screw means to expand said wall outwardly into engagement with the inner wall of said outer member.

3. A coupling as described in claim 1, and means defining another unthreaded opening in said outer member aligned with said fastening means, said unthreaded opening being of such size to receive in non-threaded relation the extension of said threaded portion projecting outwardly of said inner member.

4. A coupling comprising telescopingly engaged inner and outer tubular members, means forming an opening in said outer member, fastening means on said inner member including a threaded opening arranged diametrically opposite said opening in said outer member, screw means having a headed and threaded portion, said screw means arranged with said headed portion exerting a force against said outer member and said threaded portion screwed into said threaded opening to force the wall of the inner member tightly against the inner wall area of said outer member.

5. A coupling comprising telescopingly engaged inner and outer tubular members, means forming an unthreaded opening in said outer member, fastening means on said inner member and arranged diametrically opposite said unthreaded opening in said outer member, screw means having headed and threaded portions, said screw means arranged in said opening with said headed portion exerting a force against said unthreaded opening in said outer member and said threaded portion screwed into said fastening means on said inner member to force the wall of the latter tightly against the inner wall area of said outer member, and said fastening means on said inner member comprising thread receiving means attached to the wall of said inner member.

References Cited in the file of this patent

UNITED STATES PATENTS

| | | |
|---|---|---|
| Re. 20,445 | Newmark | July 13, 1937 |
| 1,220,648 | Leader | Mar. 27, 1917 |
| 1,537,227 | DeWitt | May 12, 1925 |
| 1,550,701 | Hoyt | Aug. 25, 1925 |